(12) United States Patent
Chuang

(10) Patent No.: US 8,641,282 B2
(45) Date of Patent: Feb. 4, 2014

(54) SEISMIC ISOLATION BEARING

(76) Inventor: Hsun-Jen Chuang, Taipei (TW)

( * ) Notice: Subject to any disclaimer, the term of this patent is extended or adjusted under 35 U.S.C. 154(b) by 0 days.

(21) Appl. No.: 13/517,657

(22) Filed: Jun. 14, 2012

(65) Prior Publication Data

US 2013/0148917 A1 Jun. 13, 2013

(30) Foreign Application Priority Data

Dec. 9, 2011 (TW) .............................. 100223258 U

(51) Int. Cl.
*F16C 41/00* (2006.01)

(52) U.S. Cl.
USPC .......................................................... 384/36

(58) Field of Classification Search
USPC .................. 384/36; 14/73.5; 52/167.4, 167.7, 52/167.8, 167.9; 248/560
See application file for complete search history.

(56) References Cited

U.S. PATENT DOCUMENTS

| | | | | |
|---|---|---|---|---|
| 3,703,014 A | * | 11/1972 | Koester | 14/73.5 |
| 4,320,549 A | * | 3/1982 | Greb | 14/73.5 |
| 6,021,992 A | * | 2/2000 | Yen et al. | 248/560 |
| 6,688,051 B2 | * | 2/2004 | Tsai | 52/167.4 |
| 8,011,142 B2 | * | 9/2011 | Marioni | 52/167.4 |
| 2006/0174555 A1 | * | 8/2006 | Zayas et al. | 52/167.4 |

* cited by examiner

*Primary Examiner* — Thomas R Hannon
(74) *Attorney, Agent, or Firm* — Alan Kamrath; Kamrath IP Lawfirm, P.A.

(57) ABSTRACT

A seismic isolation bearing has a lower plate and an upper plate separated by a slider. The lower plate has an upward facing concave surface. The upper plate has a downward facing concave surface. The slider includes a first member and a second member separated by a shock absorbing pad. The first member has an upper convex surface that slides along the concave surface of the upper plate. The second member has a lower convex surface that slides along the concave surface of the lower plate. In the event of an earthquake, the lower plate and the upper plate are intended to move relative to each other via the slider to dissipate the horizontal seismic energy. In addition, the shock absorbing pad can deform to absorb the vertical seismic energy. Thus, the seismic isolation bearing can increase its ability to isolate seismic energy.

4 Claims, 4 Drawing Sheets

SEISMIC ISOLATION BEARING

BACKGROUND OF THE INVENTION

1. Field of the Invention

The present invention relates to a seismic isolation bearing and, more particularly, to a seismic isolation bearing which employs a shock absorbing pad to increase its ability to isolate seismic energy.

2. Description of the Prior Arts

A seismic isolation bearing is a base isolation device provided for protecting various structures from the damaging effects of earthquakes. With reference to FIG. 3, a conventional seismic isolation bearing comprises a lower plate 40 and an upper plate 50 separated by a slider 60. The lower plate 40 has an upward facing concave surface 41. The upper plate 50 has a downward facing concave surface 51. The slider 60 has an upper convex surface 61 that slides along the concave surface 51 of the upper plate 50 and has a lower convex surface 62 that slides along the concave surface 41 of the lower plate 40. When in use, the lower plate 40 rests on the ground base on which the structure to be supported would rest, while that structure rests on the upper plate 50. In the event of an earthquake, the lower plate 40 and the upper plate 50 are intended to move relative to each other via the slider 60 between the lower and upper plates 40, 50. The structure supported is thus isolated from the seismic energy. However, such seismic isolation bearing can only dissipate the horizontal seismic energy. The vertical seismic energy still exists, so that it can still destroy the structure.

With reference to FIG. 4, another conventional seismic isolation bearing comprises a lower plate 70 and an upper plate 80 separated by a slider 90. The lower plate 70 has an upward facing concave surface 71. The upper plate 80 has a downward facing concave surface 81. The slider 90 includes a first member 91 and a second member 92. The first member 91 has an upper convex surface 911, a lower surface and a recess 912. The convex surface 911 slides along the concave surface 81 of the upper plate 80. The recess 912 is formed in the lower surface of the first member 91. The second member 92 has a lower convex surface 921, an upper surface and a projection 922. The convex surface 921 slides along the concave surface 71 of the lower plate 70. The projection 922 extends from the upper surface of the second member 92 and is received in the recess 912 of the first member 91. In the event of an earthquake, the lower plate 70 and the upper plate 80 are intended to move relative to each other via the slider 90 between the lower and upper plates 70, 80 to dissipate the horizontal seismic energy. In addition, the first member 91 and the second member 92 are intended to deflect relative to each other to absorb the vertical seismic energy. However, the first member 91 and the second member 92 are connected only by the recess 912 receiving the projection 922. The connecting area of the first and second members 91, 92 is too small, which causes stress concentration therebetween and thus destroys the first and second members 91, 92.

To overcome the shortcomings, the present invention provides a seismic isolation bearing to mitigate or obviate the aforementioned problems.

SUMMARY OF THE INVENTION

The main objective of the present invention is to provide a seismic isolation bearing which employs a shock absorbing pad to increase its ability to isolate seismic energy.

To achieve the foregoing objective, the seismic isolation bearing in accordance with the present invention comprises a lower plate and an upper plate separated by a slider. The lower plate has an upward facing concave surface. The upper plate has a downward facing concave surface. The slider includes a first member and a second member separated by a shock absorbing pad. The first member has an upper convex surface that slides along the concave surface of the upper plate. The second member has a lower convex surface that slides along the concave surface of the lower plate. In the event of an earthquake, the lower plate and the upper plate are intended to move relative to each other via the slider between the lower and upper plates to dissipate the horizontal seismic energy. In addition, the shock absorbing pad can deform to absorb the vertical seismic energy and to ensure a complete contact between the first member and the upper plate and between the second member and the lower plate. Thus, such seismic isolation bearing employing the shock absorbing pad can increase its ability to isolate seismic energy.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
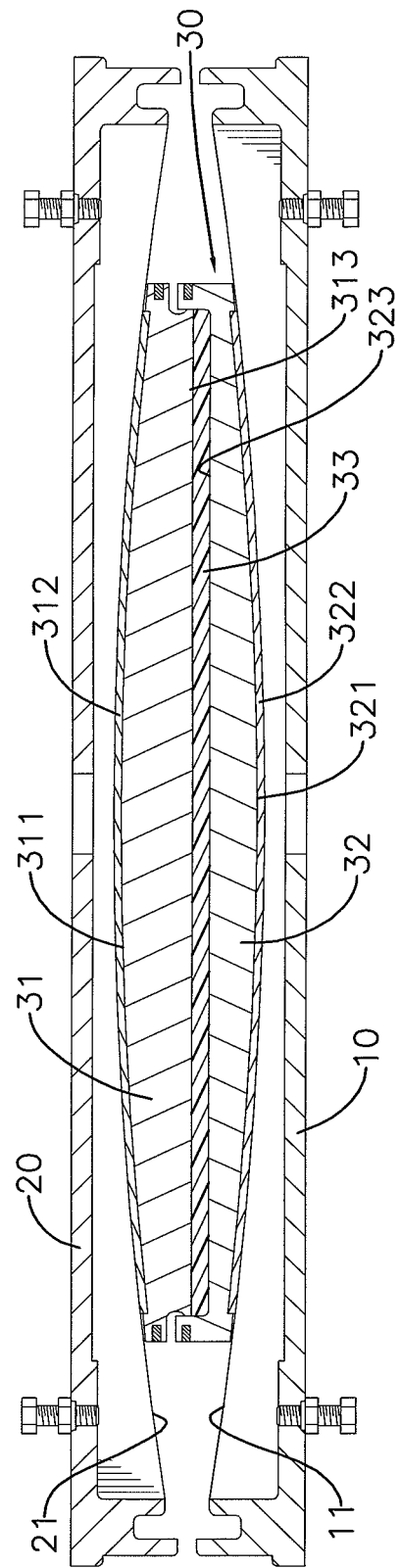
FIG. 1 is a cross-sectional side view of a seismic isolation bearing in accordance with the present invention.

With reference to FIG. 1, a seismic isolation bearing in accordance with the present invention comprises a lower plate 10, an upper plate 20 and a slider 30.

The lower plate 10 is a circular steel plate and has an upward facing concave surface 11.

The upper plate 20 is separated from the lower plate 10, is a circular steel plate and has a downward facing concave surface 21.

The slider 30 is slidably mounted between the lower and upper plates 10, 20, is circular and includes a first member 31 and a second member 32 separated by a shock absorbing pad 33. The first member 31 has an upper convex surface 311 that slides along the concave surface 21 of the upper plate 20. The second member 32 has a lower convex surface 321 that slides along the concave surface 11 of the lower plate 10. The shock absorbing pad 33 is made of rubber.

In a preferred embodiment, the first member 31 has a polytetrafluoroethylene (PTFE) piece 312 inlaid in the convex surface 311 thereof and contacting the concave surface 21 of the upper plate 20. The second member 32 has a PTFE piece 322 inlaid in the convex surface 321 thereof and contacting the concave surface 11 of the lower plate 10. PTFE has one of the lowest coefficients of friction against any solid so that the slider 30 can smoothly slide between the lower and upper plates 10, 20.

The second member 32 further has a recessed portion 323 on its upper surface for receiving the shock absorbing pad 33. The first member 31 further has a projection portion 313 on its lower surface. The projection portion 313 is received in the recess portion 323 of the second member 32 and abuts the shock absorbing pad 33. Therefore, the first member 31 and the second member 32 can be positioned by the cooperation of the recessed portion 323 and the projection portion 313.

Figure 2:
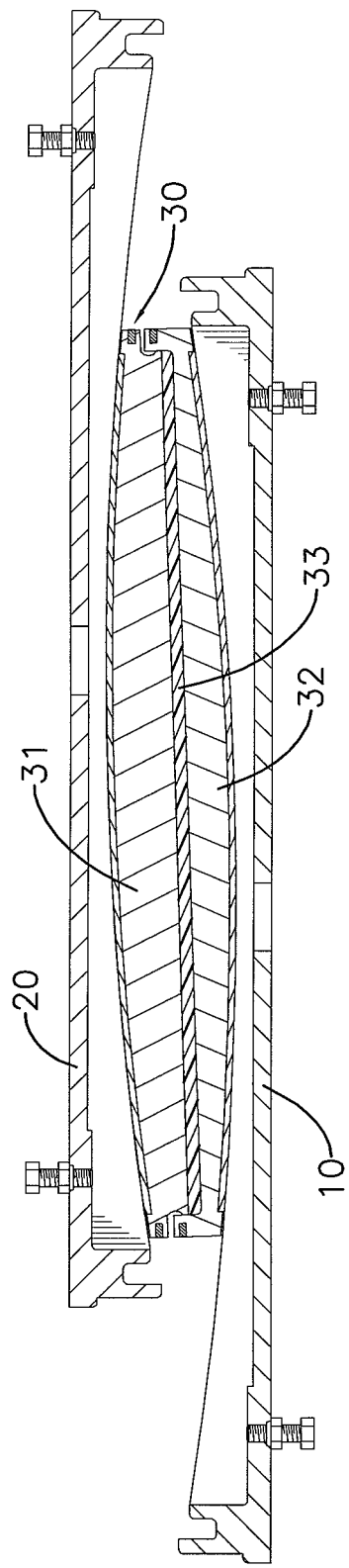
FIG. 2 is a cross-sectional side view of the seismic isolation bearing in FIG. 1 showing that a lower plate and an upper plate are moved relative to each other.
Figure 3:
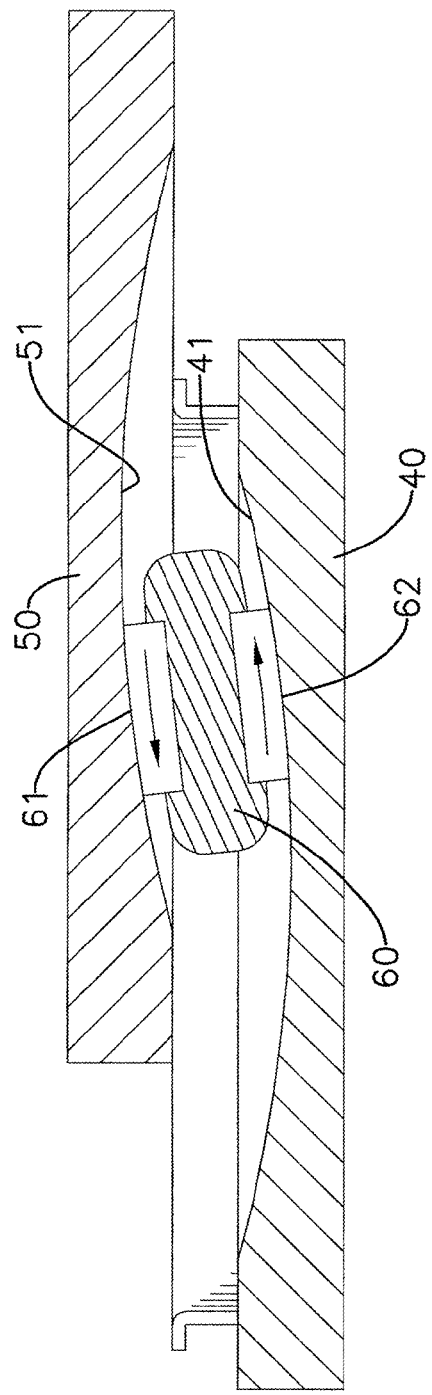
FIG. 3 is a cross-sectional side view of a conventional seismic isolation bearing in accordance with the prior art.
Figure 4:
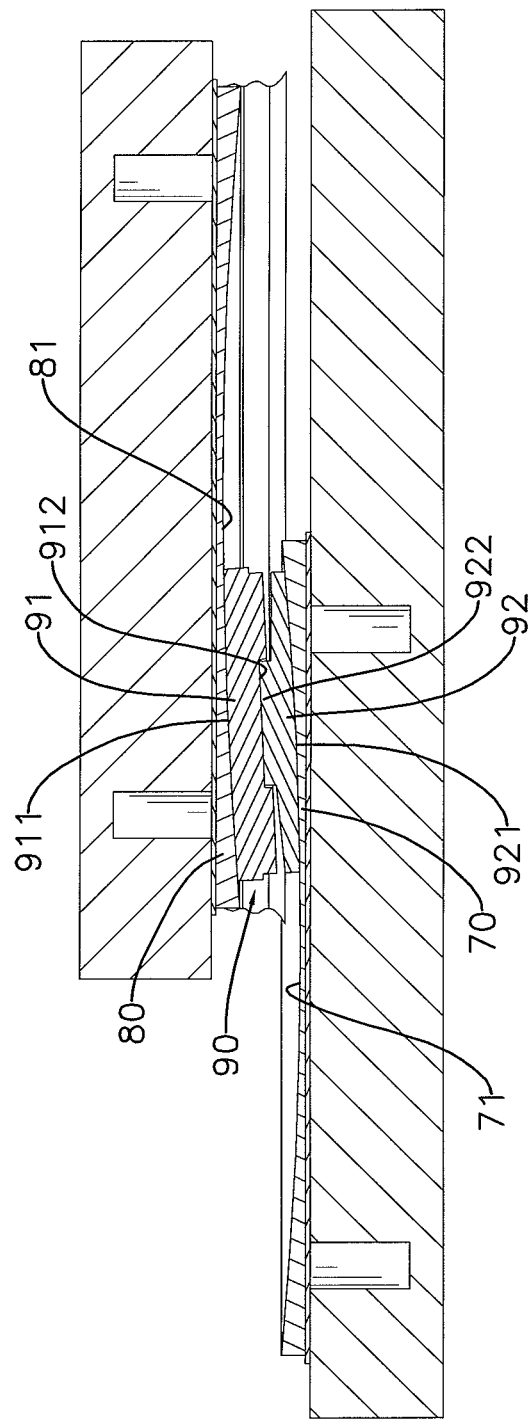
FIG. 4 is a cross-sectional side view of another conventional seismic isolation bearing in accordance with the prior art.

When in use, the lower plate 10 rests on the ground base on which the structure to be supported would rest, while that structure rests on the upper plate 20. With reference to FIG. 2, in the event of an earthquake, the lower plate 10 and the upper plate 20 are intended to move relative to each other via the slider 30 between the lower and upper plates 10, 20 to dissipate the horizontal seismic energy. In addition, the shock absorbing pad 33 can deform to absorb the vertical seismic energy and to ensure a complete contact between the first member 31 and the upper plate 20 and between the second member 32 and the lower plate 10. The shock absorbing pad 33 contacts the first and second members 31, 32 with a large area so that the stress is evenly distributed and so that there is no stress concentration. Thus, the seismic isolation bearing in accordance with the present invention can increase its ability to isolate seismic energy.

Even though numerous characteristics and advantages of the present invention have been set forth in the foregoing description, together with details of the structure and features of the invention, the disclosure is illustrative only. Changes may be made in the details, especially in matters of shape, size and arrangement of parts within the principles of the invention to the full extent indicated by the broad general meaning of the terms in which the appended claims are expressed.

What is claimed is:

1. A seismic isolation bearing comprising:
    a lower plate having an upward facing concave surface;
    an upper plate separated from the lower plate and having a downward facing concave surface; and
    a slider slidably mounted between the lower and upper plates and including:
    a first member having an upper convex surface that slides along the concave surface of the upper plate;
    a second member having a lower convex surface that slides along the concave surface of the lower plate; and
    a shock absorbing pad mounted between the first and second members;
    wherein the second member has a recessed portion on its upper surface for receiving the shock absorbing pad, wherein the first member has a projection portion on its lower surface, and wherein the projection portion is received in the recessed portion of the second member and abuts the shock absorbing pad.

2. The seismic isolation bearing as claimed in claim 1, wherein the shock absorbing pad is made of rubber.

3. The seismic isolation bearing as claimed in claim 2, wherein:
    the first member has a polytetrafluoroethylene piece inlaid in the convex surface thereof and contacting the concave surface of the upper plate; and
    the second member has a polytetrafluoroethylene piece inlaid in the convex surface thereof and contacting the concave surface of the lower plate.

4. The seismic isolation bearing as claimed in claim 1, wherein:
    the first member has a polytetrafluoroethylene piece inlaid in the convex surface thereof and contacting the concave surface of the upper plate; and
    the second member has a polytetrafluoroethylene piece inlaid in the convex surface thereof and contacting the concave surface of the lower plate.

* * * * *